US010500522B2

(12) United States Patent
Bhargava et al.

(10) Patent No.: US 10,500,522 B2
(45) Date of Patent: *Dec. 10, 2019

(54) METHOD OF CARRYING OUT ABSORPTION/DISTILLATION IN A SINGLE COLUMN DESIGN

(71) Applicant: GTC Technology US, LLC, Houston, TX (US)

(72) Inventors: Manish Bhargava, Katy, TX (US); Joseph C. Gentry, Houston, TX (US)

(73) Assignee: GTC Technology US, LLC, Houston, TX (US)

( * ) Notice: Subject to any disclaimer, the term of this patent is extended or adjusted under 35 U.S.C. 154(b) by 491 days.

This patent is subject to a terminal disclaimer.

(21) Appl. No.: 14/604,712

(22) Filed: Jan. 24, 2015

(65) Prior Publication Data

US 2015/0211790 A1  Jul. 30, 2015

Related U.S. Application Data

(60) Provisional application No. 61/931,440, filed on Jan. 24, 2014.

(51) Int. Cl.
| | |
|---|---|
| *F25J 3/06* | (2006.01) |
| *B01D 3/14* | (2006.01) |
| *C10L 3/10* | (2006.01) |
| *C10L 3/12* | (2006.01) |
| *C10G 7/00* | (2006.01) |
| *B01D 3/40* | (2006.01) |

(52) U.S. Cl.
CPC .............. *B01D 3/141* (2013.01); *B01D 3/40* (2013.01); *C10G 7/00* (2013.01); *C10L 3/10* (2013.01); *C10L 3/12* (2013.01)

(58) Field of Classification Search
CPC ...... F25J 3/061; F25J 2200/90; F25J 2200/96; F25J 2205/90; B01D 3/14; B01D 3/141; B01D 3/26; B01D 5/0036; B01D 5/0057; B01D 3/40

See application file for complete search history.

(56) References Cited

U.S. PATENT DOCUMENTS

| | | | |
|---|---|---|---|
| 5,709,780 A | 1/1998 | Ognisty et al. | |
| 9,724,619 B2* | 8/2017 | Bhargava | B01D 3/141 |
| 2003/0158458 A1* | 8/2003 | Prim | C07C 7/04 |
| | | | 585/800 |
| 2005/0199482 A1 | 9/2005 | Heida | |
| 2006/0287563 A1 | 12/2006 | Schultz et al. | |
| 2007/0260103 A1 | 11/2007 | Verma et al. | |
| 2009/0139852 A1 | 6/2009 | VanNuland et al. | |
| 2010/0224536 A1 | 9/2010 | Schultz et al. | |
| 2013/0206577 A1* | 8/2013 | Bauer | B01D 3/14 |
| | | | 203/8 |

(Continued)

FOREIGN PATENT DOCUMENTS

WO     WO 2013182499 A1 *  12/2013  ............. B01D 3/002

*Primary Examiner* — Brian R Gordon
(74) *Attorney, Agent, or Firm* — Winstead PC

(57) ABSTRACT

Embodiments of the invention are directed to a process wherein two different unit operations (absorption and distillation) take place on either side of a top dividing wall column. One side of the dividing wall column uses absorption to separate non-condensable components from the feed; the other side of the dividing wall uses distillation to separate heavier liquid components.

2 Claims, 4 Drawing Sheets

(56) References Cited

U.S. PATENT DOCUMENTS

2013/0267751 A1* 10/2013 Favilli ............... B01D 1/28
585/806
2014/0165649 A1* 6/2014 Ha ..................... F25J 3/08
62/617
2014/0231238 A1* 8/2014 Bhargava ........... B01D 3/141
202/161

* cited by examiner

METHOD OF CARRYING OUT ABSORPTION/DISTILLATION IN A SINGLE COLUMN DESIGN

CROSS-REFERENCES TO RELATED APPLICATIONS

This Application claims the benefit under 35 U.S.C. § 119(e) of U.S. Provisional Patent Application No. 61/931,440 filed Jan. 24, 2014 which is incorporated herein by reference in its entirety as if fully set forth herein.

FIELD OF THE INVENTION

Partial condensers are used in distillation columns when the distillate product is removed as a vapor stream. This approach is commonly employed when there are very light, i.e., volatile components in the feed to the column that would require a high column pressure and a low condenser temperature to completely condense these very volatile components. The use of a partial condenser can avoid the use of costly refrigeration in the condenser. Many distillation schemes with partial condensers have both liquid and vapor products. In such cases there is considerable spillover of heavier components in the vapor product and vice versa. It is not possible to maintain a sharp split between liquid and vapor products in conventional partial condensation schemes. This drawback can be overcome by use of a top dividing wall column that uses both absorption and distillation techniques on either side of dividing wall to provide a sharp split between vapor and liquid components.

BACKGROUND OF THE INVENTION

There are several distillation schemes in aromatics complexes that use a partial condenser for separation of lighter components. Typical examples of such columns include a $C_5$ stabilizer or a dehepatnizer column.

FIG. 1 represents a prior art system 10 of a conventional $C_5$ stabilizer 12. This conventional stabilizer aims at separating $C_1$-$C_4$ components as an overhead vapor product 14, $C_5$ as an overhead liquid product 16, and $C_{6+}$ components 18 as the bottoms product of the column. The column operates at 8.5 kg/cm² g with an overhead temperature of 40° C.

However, the prior art system of FIG. 1 possesses several disadvantages. It is not possible to condense the lighter components 14 in the overhead product at 8.5 kg/cm² g and use cooling water as the overhead cooling media. The overhead system has a partial condenser 20. Lighter components (used as offgas) are drawn as the vapor product 22 from the partial condenser 20. $C_5$ liquid product 16 is the liquid stream from the partial condenser 20. A considerable amount of $C_5$ components is lost to the offgas vapor stream. The loss of $C_5$ components can be prevented by decreasing the overhead temperature (e.g., by using refrigeration) or increasing the column pressure. However, this increases the operating cost of the column. Prior art systems, such as the prior art system of FIG. 1, provide a loose split between $C_1$ to $C_4$ in vapor and $C_5$ in liquid product. Recovery of these components is also low as they are lost in the offgass vapor stream 22.

FIG. 2 represents a prior art system of a conventional dehepatnizer column 30. This conventional dehepatnizer aims at separating lighter components ($C_1$ to $C_5$) as an overhead vapor product 32, $C_7$ as an overhead liquid product 34, and $C_{8+}$ components as a bottoms product 36 of the column. The column operates at 5.0 kg/cm² g with an overhead temperature of 40° C.

SUMMARY OF THE INVENTION

An embodiment of the invention is directed to a process wherein two different unit operations (absorption and distillation) take place on either side of a top dividing wall column. One side of the dividing wall column uses absorption to separate non-condensable components from the feed; the other side of the dividing wall uses distillation to separate heavier liquid components.

DETAILED DESCRIPTION OF EXEMPLARY EMBODIMENTS

An embodiment of the invention is directed to a process wherein two different unit operations (absorption and distillation) take place on either side of a top dividing wall of a column.

Figure 1:
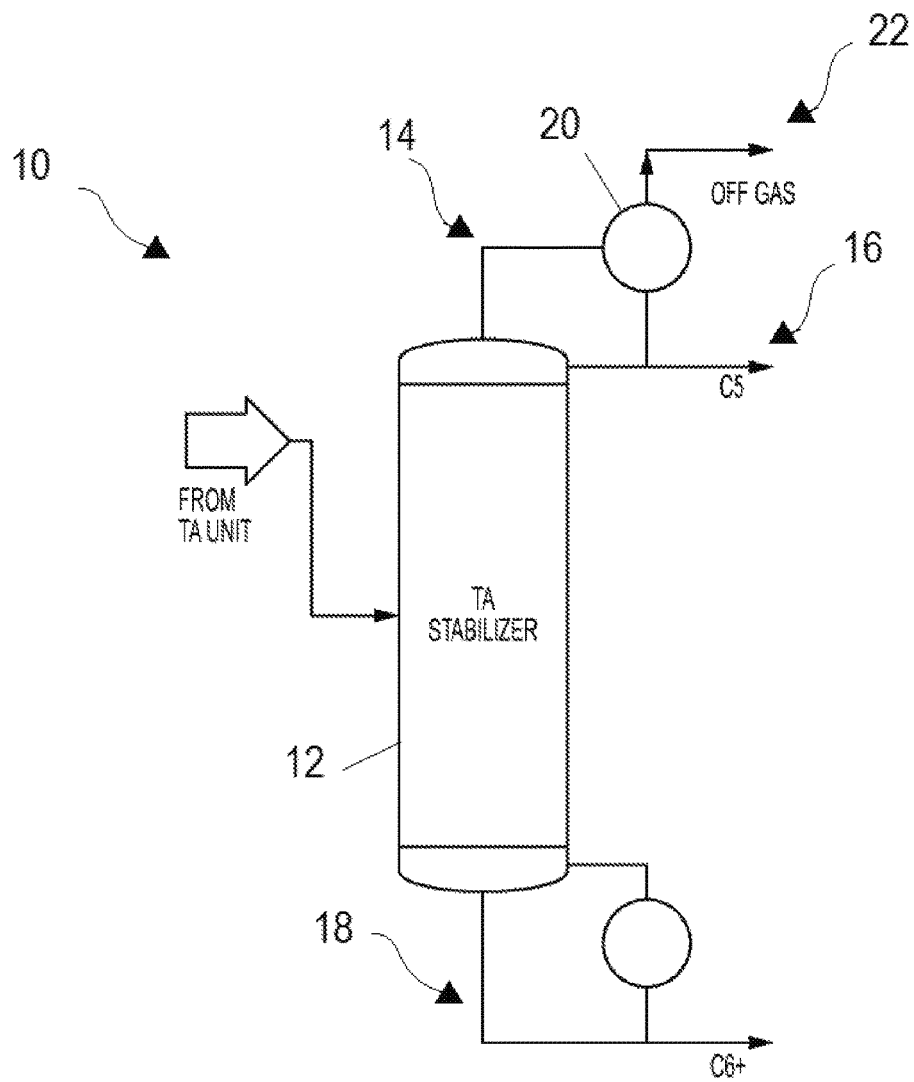
FIG. 1 represents a conventional $C_5$ stabilizer in accordance with the prior art.
Figure 2:
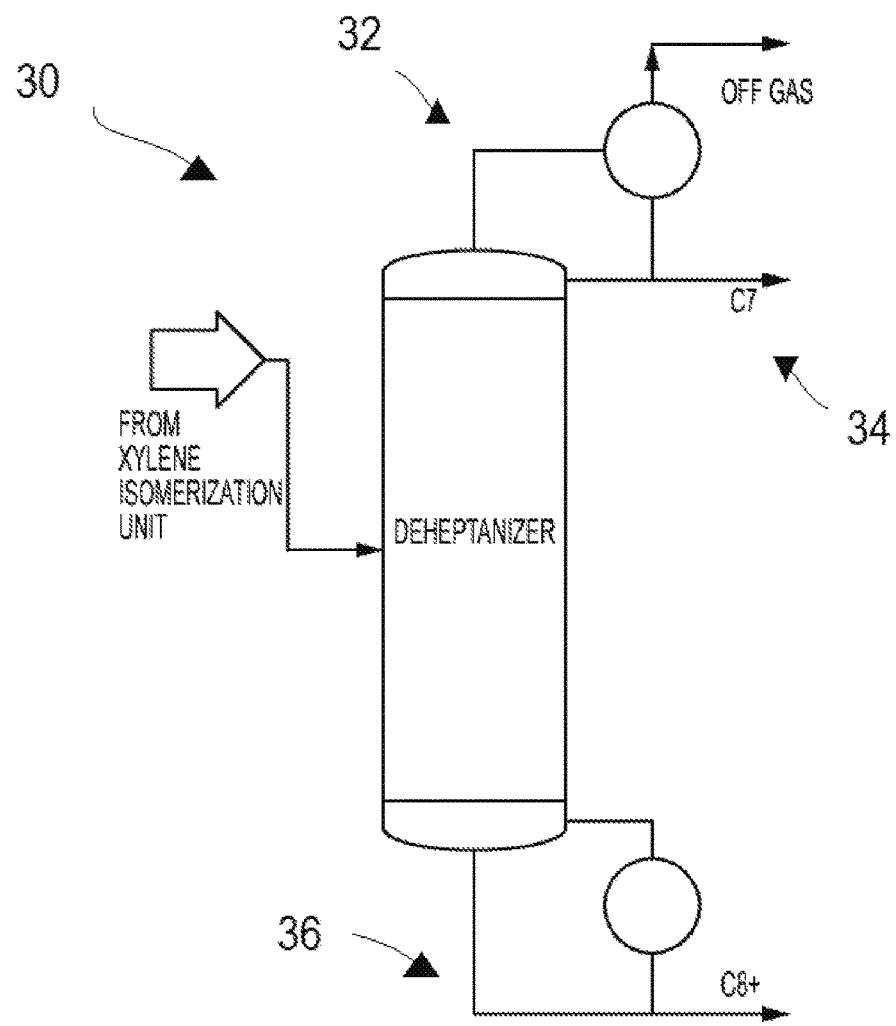
FIG. 2 represents a conventional dehepatnizer column in accordance with the prior art.
Figure 3:
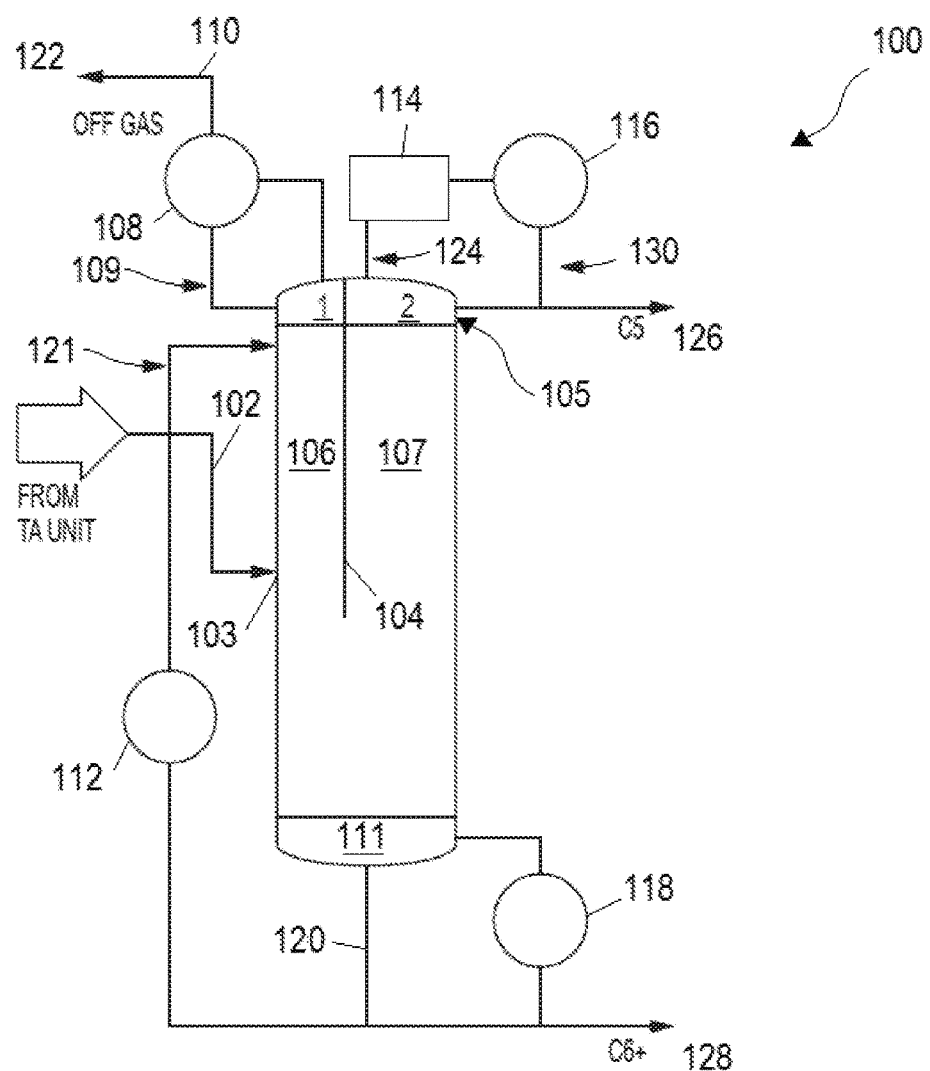
FIG. 3 represents a process scheme in accordance with an embodiment of the invention for a stabilizer design.

In an embodiment of the invention shown in FIG. 3, a process scheme of the claimed invention is designed to separate light components (non-condensable) 124, $C_5$ (Top liquid product) 126, and $C_{6+}$ (Heavies) 128 in a top divided column 100. A feed stream 102 is first sent to the pre-fractionation side of the top divided column 100 via a feed inlet 103. A vertical dividing wall 104 splits the top portion of the column into two halves. A feed side of the vertical dividing wall 104 is called a pre-fractionation section 106. An opposite side of the vertical dividing wall 104 is called a main section 107. Non-condensables (used as offgass) are removed as overhead vapor product 122 from a vent condenser 108. In certain embodiments of the invention, a column overhead pressure is set at 2.7 kg/cm² g via a pressure controller on an overhead vapor product line 110. A top section 105 is located above the pre-fractionation section 106 and the main section 107 and a bottom section 111 is located below the pre-fractionation section 106 and the main section 107. The top section 105 is comprised of a first top section 1 and a second top section 2. The first top section 1 above the feed acts as an absorption section that is primarily used to minimize a loss of heavier components. The pre-fractionation section 106 side has reflux coming from two sources: 1) a liquid stream 109 condensed from the vent condenser 108; and 2) a heavy stream or reflux 121 from a bottoms feed line 120 that is pumped by a bottoms pump 112.

In an embodiment of the invention, the light components (a vapor) 124 from the second top section 2 (the overhead of the main section 107) is condensed and cooled to 40° C. in an air-cooled exchanger 114, and then fed to a water-cooled condenser 116. An outlet of the water-cooled condenser 116 is collected in an overhead receiver. The $C_5$ liquid 126 is pumped out of the drum via reflux pumps. A portion of the light components 124 is sent back to the top divided column 100 as reflux 130 and the remainder is withdrawn as $C_5$ product 126.

In an embodiment of the invention, the temperature in the second top section 2 of the main section 107 is controlled in cascade with a reflux flow control loop that comprises a flow of fluid from top section 2 to the air-cooled exchanger 114, followed by the water-cooled condenser 116. This allows control over the quality of the $C_5$ product 126 by suppressing a tendency of heavier components from going to the top of the top divided column 100.

In an embodiment of the invention, a reboiler 118 is connected to the main section 107. The reboiler 118 may be a thermosyphon steam reboiler that uses steam as heating medium. Heat that is input to the reboiler 118 is regulated by controlling a flow of steam cascaded to the single top divided column 100 bottom tray temperature controller.

The $C_5$ bottom product is controlled by a level control loop in cascade with the bottom product flow rate.

Table 1 presents a comparison of operational parameters between the conventional stabilizer design and the TDWC stabilizer design of the claimed invention.

TABLE 1

| Operational Parameters | Units | Conventional Design | Stabilizer design of the invention |
|---|---|---|---|
| $C_5$ in product | Kg/hr | 367 | 659 |
| Operating Pressure | Kg/cm²g | 8.3 | 2.7 |
| RVP | Psia | 107 | 27 |
| Overhead temperature | ° C. | 40 | 40 |
| Duty | MMkcal/hr | 4.7 | 4.7 (integrated with HAC Overhead) |
| $C_5$ recovery | Wt % | 52.3% | 96.8% |
| $C_5$ purity | Wt % | 59.1% | 90.4% |
| Benzene in C5 product | Wt % | 0.1% | 0.1% |
| Bottoms temperature | ° C. | 229 | 183 |

Figure 4:
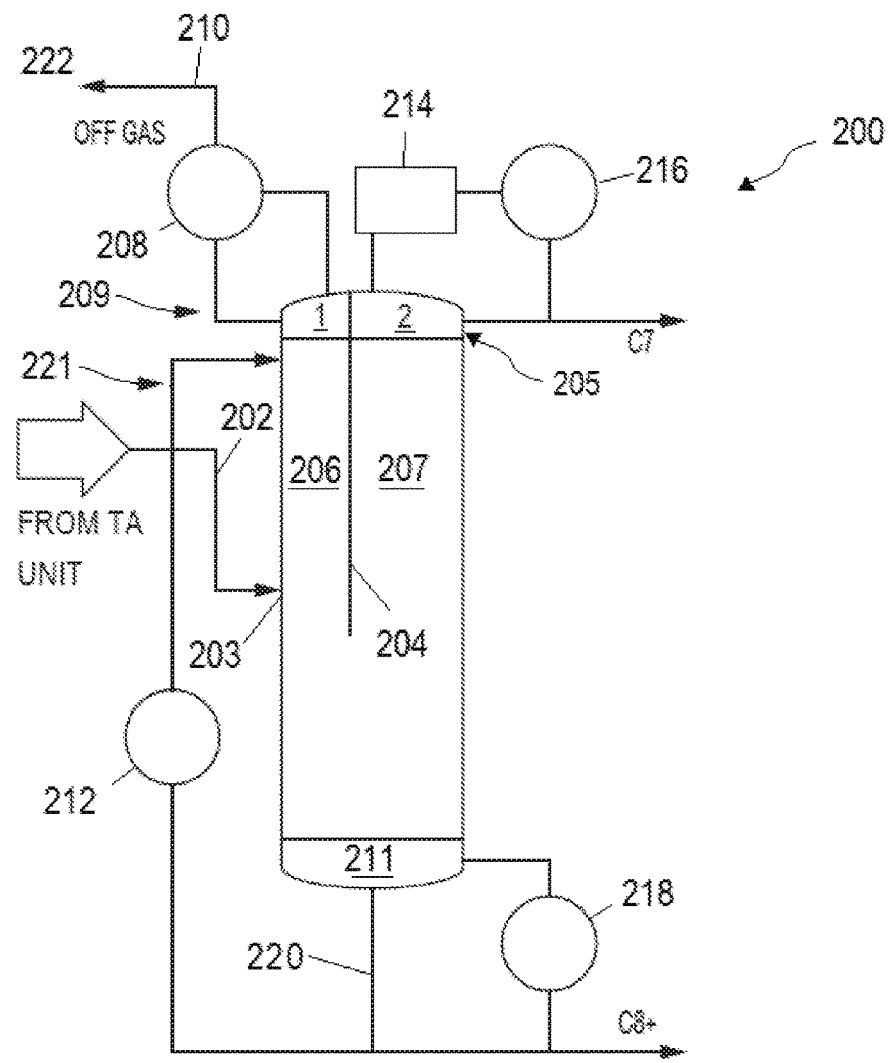
FIG. 4 represents a process scheme in accordance with an embodiment of the invention for a deheptanizer design.

FIG. 4 represents a process scheme in accordance with an embodiment of the invention for a deheptanizer design 200. FIG. 4 illustrates a top divided column 200 that is similar to the top divided column 100. Parts in FIG. 4 that are similar to the parts of FIG. 3 include similar part numbers. A pressure of the top divided column 200 is reduced to 1.8 kg/cm² g. GT-Low pressure deheptanizer reduces consumption of energy by 19%. Similar to FIG. 3, top divided column 200 includes a feed stream 202, a feed inlet 203, a vertical dividing wall 204, a top section 205, a pre-fractionation section 206, a main section 207, a vent condenser 208, a liquid stream 209, an overhead vapor product line 210, a bottom section 211, a bottoms pump 212, an air-cooled exchanger 214, a water-cooled condenser 216, a reboiler 218, a bottoms feed line 220, a heavy stream or reflux 221, and overhead vapor product 222.

Table 2 presents a comparison between the conventional deheptanizer design and the TDWC stabilizer design of the claimed invention.

TABLE 2

| Operational Parameters | Units | Conventional Design | Stabilizer design of the invention |
|---|---|---|---|
| Operating Pressure | Kg/cm²g | 5 | 1.8 |
| Overhead temperature | ° C. | 40 | 40 |
| Duty | Mmkcal/hr | 23.3 | 18.9 |
| Bottoms temperature | ° C. | 227 | 193 |

Overall aspects of the invention relate to methods for increasing the energy efficiency or better product purities in a distillation process using a top divided column. Those having skill in the art, with the knowledge gained from the present disclosure, will recognize that various changes could be made to the methods disclosed herein without departing from the scope of the present invention. Mechanisms used to explain theoretical or observed phenomena or results, shall be interpreted as illustrative only and not limiting in any way the scope of the appended claims.

What is claimed is:

1. A separation system comprising:
a top divided column comprising:
a vertical dividing wall disposed in the top divided column, the vertical dividing wall extending from a top of the top divided column and terminating above a bottom of the top divided column, the vertical dividing wall dividing the top divided column into a first side and a second side disposed on opposites sides of the vertical dividing wall; wherein the vertical dividing wall extends downward from a peripheral wall of the top divided column and terminates at a length that is less than the entire vertical length of the top divided column;
a first top section disposed in the top of the top divided column and on the first side of the vertical dividing wall and a second top section disposed in the top of the top divided column and on the second side of the vertical dividing wall;
a first section positioned beneath the first top section and on the first side of the vertical dividing wall, the first section extending from beneath the first top section;
a second section positioned beneath the second top section and on the second side of the vertical dividing wall, the second section extending from beneath the second top section; and
a first inlet fluidly coupled to the first section;
a first condenser fluidly coupled to the first top section;
an exchanger fluidly coupled to the second top section;
a second condenser fluidly coupled between the exchanger and the second top section; and
a pump fluidly coupled to a second inlet of the first section and an outlet of a third section of the top divided column, the third section disposed in the bottom of the top divided column and beneath the first and second sections;
wherein the first top section comprises a third inlet fluidly coupled to the first condenser;
wherein the first section comprises a fourth inlet fluidly coupled to the pump; and
wherein the second top section comprises a fifth inlet fluidly coupled to the second condenser.

2. The separation system of claim 1, wherein the condenser further comprises a second outlet fluidly coupled to the condenser.

* * * * *